(12) United States Patent
Kim et al.

(10) Patent No.: US 8,145,121 B2
(45) Date of Patent: Mar. 27, 2012

(54) WIRELESS COMMUNICATION SYSTEM COUNTING MOBILE TERMINALS USING MBMS

(75) Inventors: Jung-Im Kim, Daejeon (KR); Byung-Han Ryu, Daejeon (KR); Seung-Chan Bang, Daejeon (KR)

(73) Assignees: Electronics and Telecommunications Research Institute, Daejeon (KR); SK Telecom Co., Ltd., Seoul (KR); KT Corporation, Seongnam (KR)

( * ) Notice: Subject to any disclaimer, the term of this patent is extended or adjusted under 35 U.S.C. 154(b) by 848 days.

(21) Appl. No.: 12/086,087

(22) PCT Filed: Dec. 6, 2006

(86) PCT No.: PCT/KR2006/005254
§ 371 (c)(1),
(2), (4) Date: Jun. 5, 2008

(87) PCT Pub. No.: WO2007/066982
PCT Pub. Date: Jun. 14, 2007

(65) Prior Publication Data
US 2009/0280738 A1    Nov. 12, 2009

(30) Foreign Application Priority Data

Dec. 8, 2005 (KR) .................. 10-2005-0120136
Jun. 30, 2006 (KR) .................. 10-2006-0060377

(51) Int. Cl.
*H04H 20/71* (2008.01)
*H04B 7/00* (2006.01)
*H04M 1/00* (2006.01)

(52) U.S. Cl. ............. 455/3.01; 455/502; 455/550.1

(58) Field of Classification Search .............. None
See application file for complete search history.

(56) References Cited

U.S. PATENT DOCUMENTS

| | | | |
|---|---|---|---|
| 2001/0017881 A1* | 8/2001 | Bhatoolaul et al. | 375/130 |
| 2004/0146019 A1* | 7/2004 | Kim et al. | 370/329 |
| 2004/0157602 A1 | 8/2004 | Khawand | |
| 2004/0157640 A1* | 8/2004 | Pirskanen et al. | 455/552.1 |
| 2004/0203578 A1* | 10/2004 | Toriyama | 455/405 |
| 2007/0079381 A1* | 4/2007 | Hartung et al. | 726/26 |

FOREIGN PATENT DOCUMENTS

| | | |
|---|---|---|
| KR | 10-2004-0064867 | 7/2004 |
| WO | 2004/102901 A1 | 11/2004 |
| WO | 2005/078959 A1 | 8/2005 |
| WO | 2005/101738 A1 | 10/2005 |

* cited by examiner

*Primary Examiner* — Yuwen Pan
*Assistant Examiner* — Ayodeji Ayotunde
(74) *Attorney, Agent, or Firm* — Staas & Halsey LLP (57) ABSTRACT

The embodiments relate to a wireless communication system that counts UEs using an MBMS. The wireless communication system is connected with a UE through a radio link, and includes a Node B and a controlling radio network controller (CRNC). The Node B receives sequence setting information on a sequence included in a preamble transmitted from the UE network manager. The CRNC controls the Node B, detects a sequence according to whether to use an MBMS based on the sequence setting information, and performs a counting process for counting UEs based on whether the UE uses the MBMS.

According to the embodiments, counting of UEs using an MBMS can be performed by using a predetermined sequence. Particularly, the counting process can be simplified by reducing complexity in access probability management of a network manager, thereby increasing efficiency in data transmission by reducing signaling for random access probability and omitting a random access probability calculation process.

11 Claims, 9 Drawing Sheets

[FIG. 1]

CONVENTIONAL

WIRELESS COMMUNICATION SYSTEM COUNTING MOBILE TERMINALS USING MBMS

TECHNICAL FIELD

The present invention relates to a wireless communication system counting user equipment (UE) that uses a multimedia broadcasting and multicast service (MBMS), and a method thereof. More particularly, the present invention relates to a $3^{rd}$ Generation Partnership Project (3GPP)-based wireless communication system providing efficient counting by using a preamble for simplifying counting of UE that uses an MBMS.

BACKGROUND ART

A multimedia broadcast and multicast service (MBMS) that provides a broadcasting service to a mobile phone in a $3^{rd}$ Generation Partnership Project (3GPP) wireless communication system has been standardized in various groups of the 3GPP.

Such a 3GPP wireless communication system includes a wideband code division multiple access (WCDMA) system and a single carrier frequency division multiple access (SC-FDMA)-based long term evolution (LTE) system.

The MBMS is divided into a broadcast service and a multicast service, and only the multicast service may be charged.

In the case of the multicast service, the UE in a given cell is asked whether to use an MBMS. Then, when the UE responds to more than a predetermined number of services, the MBMS is provided to the UE through a secondary common control physical channel (S-CCPCH), and when the UE responds to less than the predetermined number of services, the MBMS is provided to the UE through a dedicated physical channel (DPCH) for efficient radio resource management.

When no UE requests the MBMS, a service is not provided.

When the UE requests receiving the MBMS, the UE needs to perform a random access. When performing the random access, the UE randomly requests access from a base station, and therefore may experience collision with another UE that uses the same preamble code.

Figure 1:
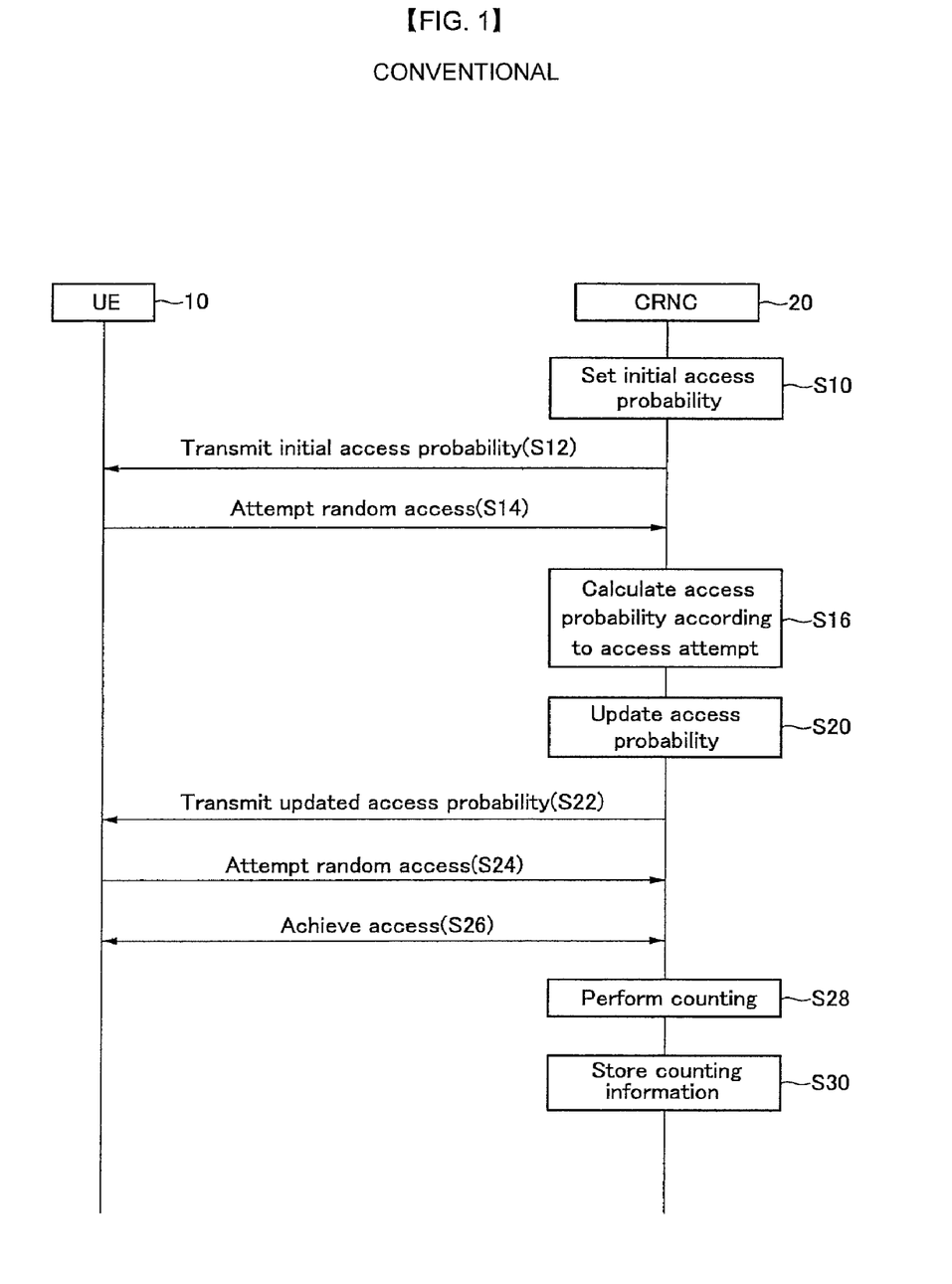
FIG. 1 is a dataflow in a conventional counting process between a controlling radio network controller (CRNC) and a UE in a wireless communication system.

In order to minimize such a collision, a controlling radio network controller (CRNC) manages a conventional counting process as shown in FIG. 1.

FIG. 1 shows dataflow in a conventional counting process between a CRNC and a UE in a wireless communication system.

As shown in FIG. 1, in the conventional counting process, a CRNC 20 that manages cells sends a signal to provide an initial access probability factor to the UE 10 in the cell, in step S12.

When receiving the initial access probability factor, the UE 10 attempts a random access by using a proper access probability factor according to a current state of the UE 10, in step S14.

When new counting process is required, the CRNC 20 calculates an optimal access probability factor in step S16, updates the access probability factor with the calculated access probability factor, and transmits the updated access probability factor to the UE 10 by sending a signal thereto, in steps S20 to S22.

The UE 10 receives the updated access probability factor and attempts a random access by using the updated access probability factor, in step S24.

When the UE 10 accesses the CRNC 20 by performing the random access in step S26, the CRNC 20 performs the counting process according to the access of the UE 10 in step S28 and stores counted information in step S30.

Therefore, the CRNC needs to set the initial access probability factor and the optimal access probability factor properly such that the counting process consumes a proper period of time and an accurate counting result can be acquired.

When the CRNC sets the access probability factor high so as to generate collision between UEs that attempt random access or when the CRNC sets the access probability factor low in a situation that few UEs attempt the random access, the counting process consumes a much longer time than normal random access.

A conventional random access preamble P(i) used in the 3GPP WCDMA system is formed by a product of a gold sequence $GN_i$ and a signature sequence $C_i$, and it can be represented as given in Math Figure 1. Herein, the number of random access preamble symbols is denoted as n (n=4096 chips in the WCMDA system).

A 3GPP long term evolution (LTE) system uses a single carrier frequency division multiple access (SC-FDMA), and a random access preamble P(i) used in the SC-FDMA also can be represented as given in Math Figure 1. However, n in the SC-FDMA denotes the number of time domain sampling symbols.

When the signature sequence is generated as a Hadamard sequence with a length of m, the signature sequence can be represented as given in Math Figure 2.

Then, the UE randomly selects a signature sequence according to a state of the UE.

$$P(i)=GN_i * C_i \qquad \text{[Math Figure 1]}$$

Where i=0, 1, 2, . . . , n−1, and n is a natural number.

$$C_i = H_m(i\%m) \qquad \text{[Math Figure 2]}$$

Where i=0, 1, 2, . . . , n−1, and n is a natural number, and m=16.

In this case, the Hadamard sequence can be defined as given in Math Figure 3.

$$H_0 = (1) \qquad \text{[Math Figure 3]}$$
$$H_k = \begin{pmatrix} H_{k-1} & H_{k-1} \\ H_{k-1} & -H_{k-1} \end{pmatrix}, \quad k \geq 1$$

When UEs simultaneously attempting random access select the same signature sequence, collision is generated between the UEs and the random access fails. When the UEs select different signature sequences, the random access can be successfully performed.

However, it is difficult to determine whether a UE performs a random access for using MBMS by only using the signature sequence in the conventional wireless communication system. In addition, when the random access is performed for MBMS counting, a signal for controlling a random access for a different purpose can be transmitted to the UE that performs the random access for using the MBMS, such that the UE performs the random access for the different purpose, which may have a low random access probability factor.

The gold sequence $GN_i$ of Math Figure 1 can be generated by using two maximal length sequences (m-sequences) x and y among m-sequences in two primitive polynomials as given in Math Figure 4. The primitive polynomial forming the sequence x can be represented as given in Math Figure 4.

$$X^{25}+X^3+1 \qquad \text{[Math Figure 4]}$$

In addition, the primitive polynomial forming the sequence y can be represented as given in Math Figure 5.

$$X^{25}+X^3+X^2+X+1 \quad \text{[Math Figure 5]}$$

An initial value of the sequence x of Math Figure 4 has a scrambling code of $x_n(0)=n_0$, $x_n(1)=n_1$, ..., $x_n(22)=n_{22}$, $x_n(23)=n_{23}$, and $x_n(24)=1$, and the sequence y of Math Figure 5 has an initial value of $y(0)=y(1)=, ..., =y(23)=y(24)=1$.

A gold sequence $Z_n$ generated by using the sequences x and y can be represented as given in Math Figure 6.

$$Z_n(i)=x_n(i)+y(i) \text{ modulo } 2, \text{ for } i=0, 1, 2, \ldots, 2^{25}-2 \quad \text{[Math Figure 6]}$$

In addition, a real number value of the sequence $z_n$ can be calculated as given in Math Figure 7, and $GN_i = Z_n(i)$.

$$Z_n(i) = \begin{cases} +1 & \text{if } z_n(i) = 0 \\ -1 & \text{if } z_n(i) = 1 \end{cases} \quad \text{[Math Figure 7]}$$
$$\text{for } i = 0, 1, \ldots, 2^{25} - 2$$

Where n is determined by a scrambling code used by a Node B (i.e., base station) and a signature sequence used by the UE, and therefore the gold sequence does not indicate whether or not it is dedicated to an MBMS.

That is, a preamble of the conventional system does not specify MBMS counting and non-MBMS counting. Therefore, the conventional wireless communication system must analyze a proper random access probability factor during the MBMS counting process and transmit the analyzed random access probability factor to the UE by using a signal. That is, the conventional system complicates the counting process by generating an unnecessary signaling process and insufficiently performs an MBMS counting process.

The above information disclosed in this Background section is only for enhancement of understanding of the background of the invention and therefore it may contain information that does not form the prior art that is already known in this country to a person of ordinary skill in the art.

DISCLOSURE

Technical Problem

It is an object of the present invention to provide a 3GPP wireless communication system that uses a preamble to simplify a process for counting UEs using an MBMS to thereby provide an efficient counting process, and a method thereof.

Technical Solution

A wireless communication system according to an embodiment of the present invention counts user equipment (UE) using an MBMS.

The wireless communication system includes a base station node (Node B) and a controlling radio network controller (CRNC). The Node B is connected with the UE through a radio link, and receives sequence setting information for a sequence included in a preamble transmitted from the UE from a network manager, receives the preamble, and detects a sequence dedicated to an MBMS based on the sequence setting information. The CRNC controls the Node B and performs a counting process for counting UEs using the MBMS based on the detected sequence received from the Node B.

The Node B includes a communication module, a detection module, and a control module.

The communication module includes a wired interface, and is connected to the CRNC through a wired link, and receives the preamble of the UE from the Node B. The detection module detects a first sequence from the preamble received from the communication module based on the sequence setting information. The control module provides the sequence setting information to the detection module, receives the first sequence from the detection module, and transmits the first sequence to the CRNC.

Exemplary user equipment (UE) according to another embodiment of the present invention communicates with a wireless communication system that counts UEs using an MBMS. The UE includes a transmission module, a preamble generation module, and a control module. The transmission module includes a wireless communication interface and communicates with the wireless communication system. The preamble generation module generates a sequence including information on whether to use the MBMS based on sequence setting information, generates a preamble based on the sequence, and transmits the preamble to the transmission module. The control module controls the preamble generation module, receives and stores the sequence setting information in which information on a sequence to be used in generation of the preamble is included, and provides the sequence setting information to the preamble generation module.

The preamble generation module generates a sequence including information on whether to use an MBMS by using at least one of a signature sequence, a gold sequence, and a PN sequence.

In addition, the preamble generation module generates a sequence by using a CAZAC sequence or a Hadamard sequence.

A wireless communication method according to another embodiment of the present invention counts UEs using an MBMS.

The wireless communication method includes: a) receiving a preamble from a UE; b) detecting a sequence included in the received preamble based on sequence setting information, wherein the sequence setting information includes information is predetermined by a network manager and includes information on the sequence used by the UE; c) determining whether the UE uses an MBMS based on the detected sequence; and d) performing a counting process for counting UEs using or not using the MBMS according to the determination.

Herein, d) includes: performing a first counting process for counting UEs using the MBMS when it is determined that the UE uses the MBMS; and performing a second counting process for counting UEs using a non-MBMS when it is determined that the UE does not use the MBMS.

A wireless communication method according to another embodiment of the present invention is provided to a UE communicating with a wireless communication system, the method counting UEs using an MBMS.

The wireless communication method includes: a) receiving a user request and determining whether an MBMS is requested; b) generating a sequence including information on whether to use the MBMS based on sequence setting information according to the determination, wherein the sequence setting information is predetermined by a network manager and includes information on a sequence to be used in generation of a preamble; c) generating the preamble based on the generated sequence; and d) transmitting the generated preamble to the wireless communication system.

Herein, b) includes: generating a sequence dedicated to the MBMS when the MBMS is used according to the determination; and generating a sequence dedicated to a non-MBMS when the MBMS is not used according to the determination.

A wireless communication system according to another embodiment of the present invention counts UEs using an MBMS. The wireless communication system includes a first node and a second node. The first node is connected with a UE through a radio link and communicates data with the UE, and receives predetermined sequence setting information on a sequence included in a preamble transmitted from the UE from a network manager, detects the sequence from the preamble based on the sequence setting information, and performs a counting process for counting UEs according to whether the UE uses the MBMS. The second node is connected with the first node with a wired link, and processes a call of a packet received from the first node, manages a session, and manages mobility of the UE.

The first node detects a CAZAC sequence or a Hadamard sequence from the sequence based on the sequence setting information.

The first node performs a counting process by determining whether the UE uses the MBMS by using the CAZAC sequence based on the CAZAC sequence detection or the Hadamard sequence detection, or performs a counting process by determining whether the UE uses the MBMS by using the Hadamard sequence.

Advantageous Effects

According to the present invention, a wireless communication system that counts UEs using an MBMS can efficiently perform a counting process by using a predetermined sequence.

Particularly, complexity in access probability management of a conventional wireless communication system can be reduced to simplify a counting process such that data transmission efficiency is increased by reducing signaling in random access probability and a process for calculating random access probability can be omitted.

BEST MODE

Exemplary embodiments of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" and "comprising" will be understood to imply the inclusion of stated elements but not the exclusion of any other elements.

Further, throughout this specification and the claims which follow, a module means a unit that performs a specific function or operation, and can be realized by hardware or software, or a combination of both.

A wireless communication system that counts user equipment (UE) using a multimedia broadcasting and multicast service (MBMS) according to an exemplary embodiment of the present invention, and a method thereof will be described in more detail with reference to the accompanying drawings.

Figure 2:
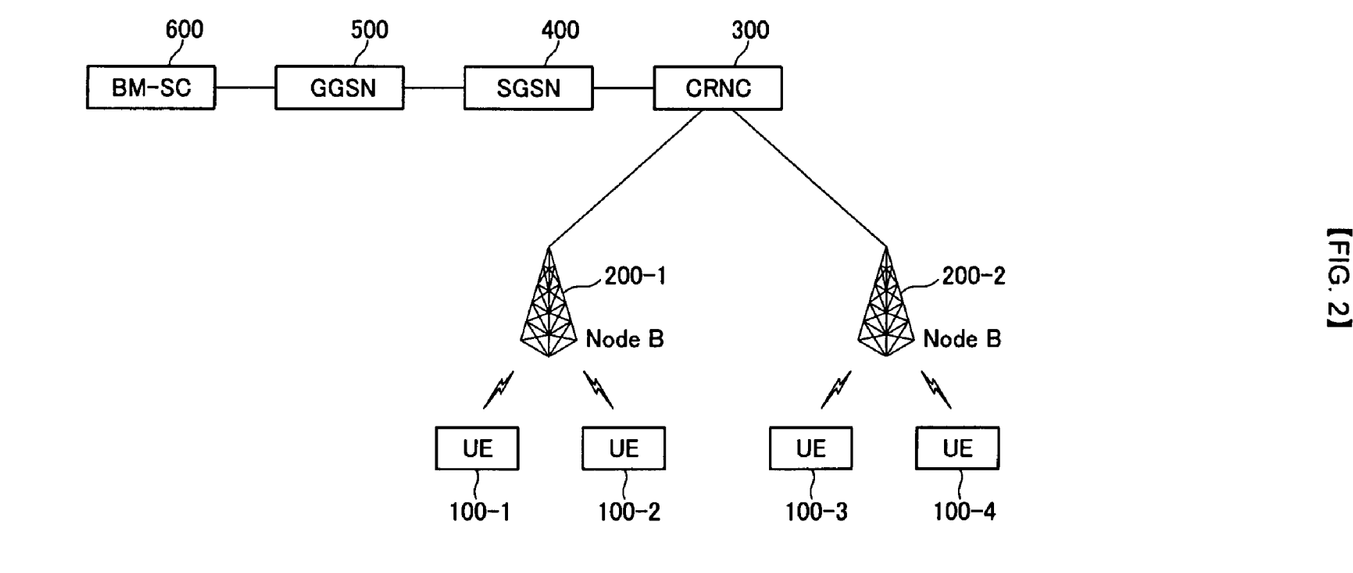
FIG. 2 is a block diagram of a 3$^{rd}$ GPP wireless communication system according to a first exemplary embodiment of the present invention.

FIG. 2 is a block diagram of a 3GPP wireless communication system according to the first exemplary embodiment of the present invention.

As shown in FIG. 2, the 3GPP wireless communication system is provided as a WCDMA system according to the first exemplary embodiment of the present invention, and includes a broadcast and multicast-service center (BM-SC) 600, a gateway general packet radio service support node (GGSN) 500, a serving general packet radio service support node (SGSN) 400, a controlling radio network controller (CRNC) 300, and a Node B 200. The GGSN 500, the SGSN 400, the CRNC 300, the Node B 200, and the BM-SC 600 are connected with each other through a wired link.

In addition, a UE 100 accesses the Node B 200 through a wireless link and receives an MBMS from the BM-SC 600. Herein, the UE 100 and the Node B 200 communicate with each other by using a wideband code division multiple access (WCDMA).

The BM-SC 600 is a center providing an MBMS to the UE 100.

The GGSN 500 manages a plurality of SGSNs 400, manages sessions of packets received from the plurality of SGSNs 400, and manages mobility of the UE 100 as a gateway node of the 3GPP network, and the SGSN 400 processes a received packet call that matches the CRNC 300, manages a session, and manages mobility of the UE 100.

The CRNC 300 controls the Node B 200, determines whether the Node B 200 uses an MBMS by using a sequence detected from the Node B 200, and performs an MBMS counting process according to whether the Node B 200 uses the MBMS. In addition, the CRNC 300 includes a storage module for storing counting information based on the MBMS counting process.

The Node B 200 is connected with the UE 100 through a wireless link and connected with CRNC 300 through a wired link, and provides the UE 100 with MBMS information received through the wired link.

In addition, the Node B 200 receives a random access preamble from the UE 100, and detects a pseudo noise (PN) sequence, a signature sequence, or a gold sequence from the received random access preamble according to sequence information predetermined by a network manager.

The UE 100 generates a PN sequence, a signature sequence, and a gold sequence based on information on whether to use the MBMS according to sequence information predetermined by a network manager, generates a random access preamble by using the gold sequence, signature sequence, and PN sequence, and transmits the random access preamble to the Node B 200. In addition, the UE 100 receives an MBMS, which has been transmitted from the BM-SC 600, from the Node B 200, and provides the MBMS to a user of the UE 100.

Such a wireless communication system has a great merit of efficiently performing counting of UEs using an MBMS by using a predetermined sequence.

Particularly, the counting process can be simplified by reducing complexity in access probability management of the CRNC so that efficiency in data transmission can be increased (by reducing signaling due to random access probability) and random access probability calculation can be omitted.

A long term evolution (LTE) wireless communication system using single carrier frequency division multiple access (SC-FDMA) is operated in a similar way as the WCDMA-based wireless communication system, but functions of the CRNC 300 and the Node B 200 in the LTE wireless communication system are performed by a single eNode B due to characteristics of the LTE wireless communication system.

Such an LTE wireless communication system will be described in more detail later with reference to FIG. 7.

Figure 3:
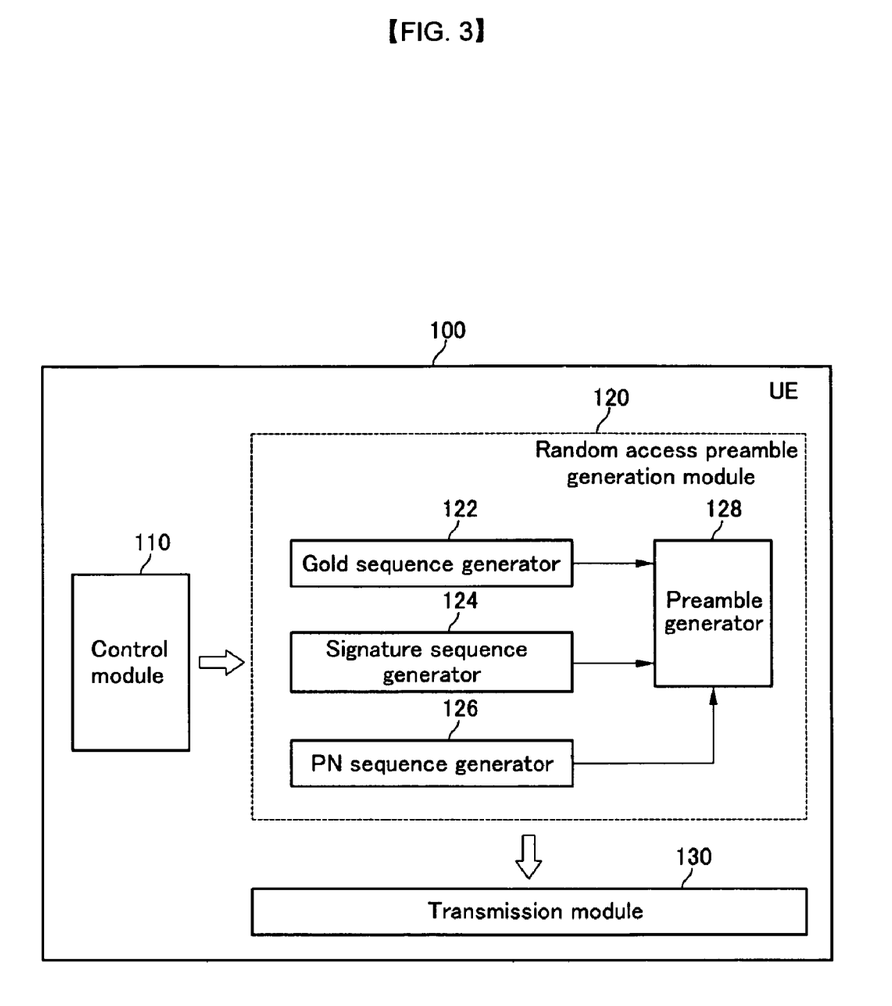
FIG. 3 is a detailed block diagram of the 3$^{rd}$ GPP wireless communication system according to the first exemplary embodiment of the present invention.

FIG. 3 is a detailed block diagram of a 3GPP WCDMA wireless communication system according to a first exemplary embodiment of the present invention.

As shown in FIG. 3, the 3GPP WCDMA wireless communication system according to the first exemplary embodiment of the present invention includes a user equipment (UE) 100 including a control module 110, a random access preamble generation module 120, and a transmission module 130.

The control module 110 receives and stores sequence setting information for a sequence to be used in generation of a preamble from a network manager, and provides the stored sequence setting information to the random access preamble generation module 120. In this case, the stored sequence setting information is the same as the sequence setting information stored in the Node B 200 of FIG. 2, and can be modified by the network manager. However, when modifying the sequence setting information stored in the control module 110, the sequence setting information that the Node B 200 uses for preamble detection must also be modified.

In addition, the control module 110 provides information on whether to use an MBMS, included in a request received from a user to the random access preamble generation module 120.

The random access preamble generation module 120 generates a random access preamble to be transmitted during initial access according to a control of the control module 110, and includes a gold sequence generator 122, a signature sequence generator 124, a pseudo noise (PN) sequence generator 126, and a preamble generator 128.

The gold sequence generator 122 receives information on whether to use the MBMS from the control module 110, and provides a first gold sequence among gold sequences to the preamble generator 128 when the MBMS is used. In addition, when the MBMS is not used, the gold sequence generator 122 provides a second gold sequence to the preamble generator 128. In this case, it is assumed that the first sequence dedicated to the MBMS and the second sequence dedicated to a non-MBMS are predetermined on the basis of the sequence setting information received from the control module 110.

In addition, the gold sequence generator 122 provides a default gold sequence to the preamble generator 128 according to the control of the control module 110.

The signature sequence generator 124 receives information on the use of the MBMS from the control module 110, and provides a first signature sequence to the preamble generator 128 when the MBMS is used. In addition, when the MBMS is not used, the signature sequence generator 124 provides a second signature sequence to the preamble generator 128. In this case, it is assumed that the first signature sequence dedicated to an MBMS and the second signature sequence dedicated to a non-MBMS are predetermined on the basis of the sequence setting information received from the control module 110.

In addition, the signature sequence generator 124 provides a default signature sequence to the preamble generator 128 according to the control of the control module 110.

For example, when the signature sequence generator 124 generates sequences by using a Hadamard sequence $H_{32}$, sequences $H_0$ to $H_{20}$ are predetermined to be used for a non-MBMS and sequences $H_{20}$ to $H_{32}$ are predetermined to be used for an MBMS.

The PN sequence generator 126 may generate a plurality of PN sequences, and includes a cell identifier for identifying a UE included in a cell managed by the Node B 200 when generating a PN sequence.

When using one PN sequence, the PN sequence generator 126 receives information on whether to use an MBMS from the control module 110, and provides a first PN sequence to the preamble generator 128 when using the MBMS.

When the MBMS is not used, the PN sequence generator 126 provides a second PN sequence to the preamble generator 128. That is, since a random access preamble is 144 bits, the first bit to N-th bit are used for the MBMS and the (N+1)-th bit to 144-th bit are used for a non-MBMS. In this case, it is assumed that N is predetermined on the basis of the sequence setting information received from the control module 110.

When the plurality of PN sequences are used, one PN sequence can be dedicated to both an MBMS and a non-MBMS or different PN sequences can be dedicated to the MBMS and the non-MBMS, respectively.

In general, two PN sequences are respectively used for an MBMS and a non-MBMS, but when one PN sequence is used for both the MBMS and non-MBMS, it can be obtained by Math Figure 8.

$$Y(i)=(1-2*C_{64+8*CN+RACN,k\%96}^{7})*(1-2*C_{1,96*CGN+k\%96}^{10})$$ [Math Figure 8]

Where, i=0, 1, 2, . . . , 191, CN and CGN denote cell identifiers indicating different cells respectively, and RACN=0, 1, 2, 3, . . . , 7 (for MBMS, RACN=0, 1, 2, 3, 4, and for non-MBMS, RACN=5, 6, 7).

Herein, $C_{s,m}^{10}$ may be represented as a polynomial having an initial value of S as given in Math Figure 9, and may be represented as a polynomial having an initial value of S as given in Math Figure 10.

$$X^{10}+X^3+1$$ [Math Figure 9]

$$X^7+X^3+1$$ [Math Figure 10]

The preamble generator 128 generates a first preamble by multiplying a gold sequence received from the gold sequence generator 122 and a default signature sequence received from the signature sequence generator 124. Herein, the gold sequence is generated in accordance with whether to use the MBMS on the basis of the sequence setting information received from the control module 110.

In addition, the preamble generator 128 generates a second preamble by multiplying a signature sequence received from the signature sequence generator 124 and the default gold sequence received from the gold sequence generator 122. Herein, the signature sequence is generated in accordance with whether to use the MBMS on the basis of the sequence setting information.

The preamble generator 128 generates a third preamble by using a PN sequence received from the PN sequence generator 126 on the basis of the sequence setting information.

The first preamble or the second preamble generated by the preamble generator 128 can be generated by a product of a gold sequence and a signature sequence as given in Math Figure 11.

$$Q(i)=GN_i * C_i$$ [Math Figure 11]

Where Q(i) denotes a preamble, $GN_i$ denotes a gold sequence, $C_i$ denotes a signature sequence, and i denotes 0, 1, 2, 3, ..., n−1 (n is a natural number).

In this case, i denotes a chip unit in a code division multiple access (CDMA) system.

As described, the preamble generator 128 generates a random access preamble by using a gold sequence and a signature sequence on the basis of predetermined sequence setting information, and accordingly, one of the gold sequence and the signature sequence can be dedicated to the MBMS.

In addition, the preamble generator 128 generates a random access preamble by using a PN sequence.

The transmission module 130 includes a wireless communication interface and communicates with the Node B 200 of FIG. 2, and provides the preamble received from the random access generation module 120 to the Node B 200 through the wireless communication interface. In this case, the transmission module 130 uses a WCDMA for data communication with the Node B 200.

The present invention has been described in connection with a UE that generates a random access preamble. Hereinafter, a CRNC performing a counting process according to use of an MBMS by using a random access preamble transmitted from a UE will be described. In this case, the CRNC receives a preamble from the Node B so as to control the counting process.

Figure 4:
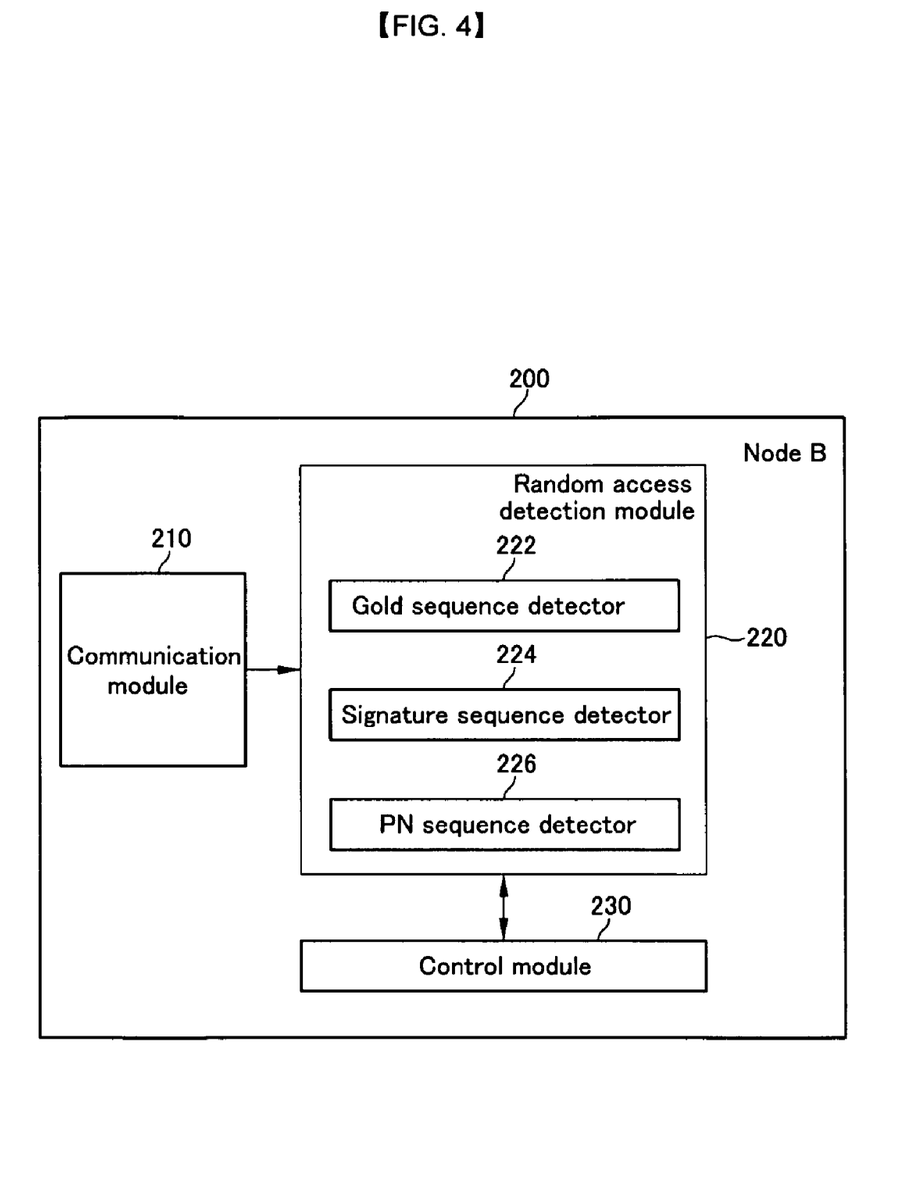
FIG. 4 is a detailed block diagram of a Node B in the 3$^{rd}$ GPP wireless communication system according to the first exemplary embodiment of the present invention.

FIG. 4 is a detailed block diagram of a Node B of the 3GPP wireless communication system according to the first exemplary embodiment of the present invention.

Herein, the 3GPP wireless communication system indicates a WCDMA-based wireless communication system.

As shown in FIG. 4, the Node B 200 according to the first exemplary embodiment of the present invention includes a communication module 210, a random access detection module 220, a control module 230, and a storage module. The Node B 200 receives the random access preamble from the UE 100 of FIG. 2, detects a sequence that has been used in generation of the preamble, and provides the detected sequence to the CRNC 300.

The communication module 210 includes a wired interface and a wireless interface, and is connected to the CRNC 300 through a wired link and wirelessly connected with the UE 100 through the wireless interface.

In addition, the communication module 210 receives the random access preamble that the UE 100 has wirelessly received, and provides the received random access preamble to the random access detection module 220.

The random access detection module 220 includes a gold sequence detector 222, a signature sequence detector 224, and a PN sequence detector 226, and receives the random access preamble transmitted from the UE 100, detects a sequence that has been used by the UE 100 according to a control of the control module 230, and provides the detected sequence to the control module 230.

The gold sequence detector 222 detects a gold sequence from the random access preamble transmitted from the UE 100, and provides the detected gold sequence to the control module 230.

The signature sequence detector 224 detects a signature sequence from the random access preamble transmitted from the UE 100, and provides the detected signature sequence to the control module 230.

The PN sequence detector 226 detects a PN sequence from the random access preamble transmitted from the UE 100, and provides the detected PN sequence to the control module 230.

Herein, the gold sequence detector 222, the signature sequence detector 224, and the PN sequence detector 226 are controlled in accordance with sequence setting information predetermined between the UE 100 and the Node B 200.

The control module 230 controls the random access detection module 220 based on the predetermined sequence setting information, receives sequence information according to sequence detection from the random access detection module 220, and provides the received sequence information to the CRNC 300.

Since the Node B receives a random access preamble from the UE, detects a sequence included in the preamble, and provides the detected sequence to the CRNC, counting UEs using an MBMS can be efficiently performed.

Figure 5:
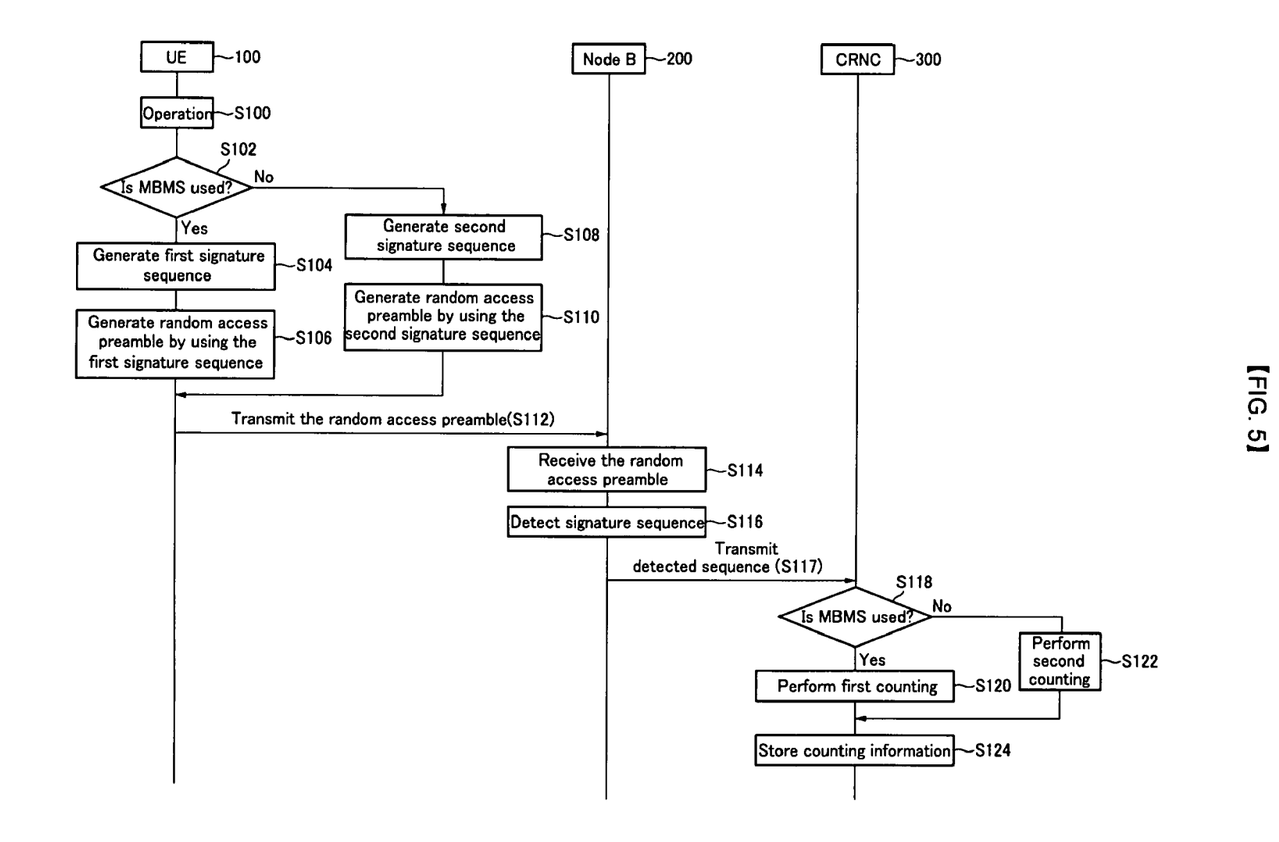
FIG. 5 is a data flowchart of an MBMS counting process for counting UEs using the MBMS in the case that a preamble transmitted from the UE is generated by a signature sequence in the 3GPP wireless communication system according to the first exemplary embodiment of the present invention.

FIG. 5 is a dataflow of an MBMS counting process for counting UEs using an MBMS in the case that a preamble transmitted from a UE is generated by using a signature sequence in the 3GPP wireless communication system according to the first exemplary embodiment of the present invention.

As shown in FIG. 5, in the case that the preamble is generated by using the signature sequence, it is assumed that the MBMS counting process is set to use a signature sequence between the UE 100 and the CRNC 300 by the network manager in the 3GPP wireless communication system according to the first exemplary embodiment of the present invention.

When the UE 100 is operated in step S100, the UE 100 receives a request for an MBMS from a user.

The UE 100 determines whether a request to use the MBMS is received from a user in step S102. Upon arrival of a request, the UE 100 generates a first signature sequence based on predetermined sequence setting information, in step S104. In this case, the first signature sequence is dedicated to the MBMS.

When the UE 100 does not receive a request in step S102, the UE 100 generates a second signature sequence based on the predetermined setting information, in step S108. In this case, the second signature sequence is dedicated to a non-MBMS.

The UE 100 generates a random access preamble by using the first signature sequence or the second signature sequence in steps S106 and S110, and transmits the generated random access preamble to the Node B 200, in step S112.

The Node B 200 receives the random access preamble from the UE 100 in step S114, and detects a signature signal from the received random access preamble in step S116. In addition, the detected signature sequence is transmitted to the CRNC 300, in step S117.

The CRNC 300 determines whether the detected sequence is dedicated to the MBMS based on the predetermined sequence setting information, in step S118.

When it is determined in step S118 that the detected sequence is dedicated to the MBMS, the CRNC 300 performs a first MBMS counting process for counting UEs using the MBMS and stores the counting information, in steps S120 and S124.

When it is determined in step S118 that the detected sequence is dedicated to the MBMS, the CRNC 300 performs a first MBMS counting process for counting UEs using the MBMS and stores the counting information, in steps S120 and S124.

The 3GPP WCDMA wireless communication system may generate a random access preamble by using a gold sequence between the UE 100 and the CRNC 300 based on the sequence setting information predetermined by the network manager and efficiently perform the MBMS counting process. Herein, the gold sequence indicates information on whether to use an MBMS. In more detail, the preamble is changed into a gold sequence and this is well known to a person of ordinary skill in the art, and therefore, a further description related thereto will be omitted.

Figure 6:
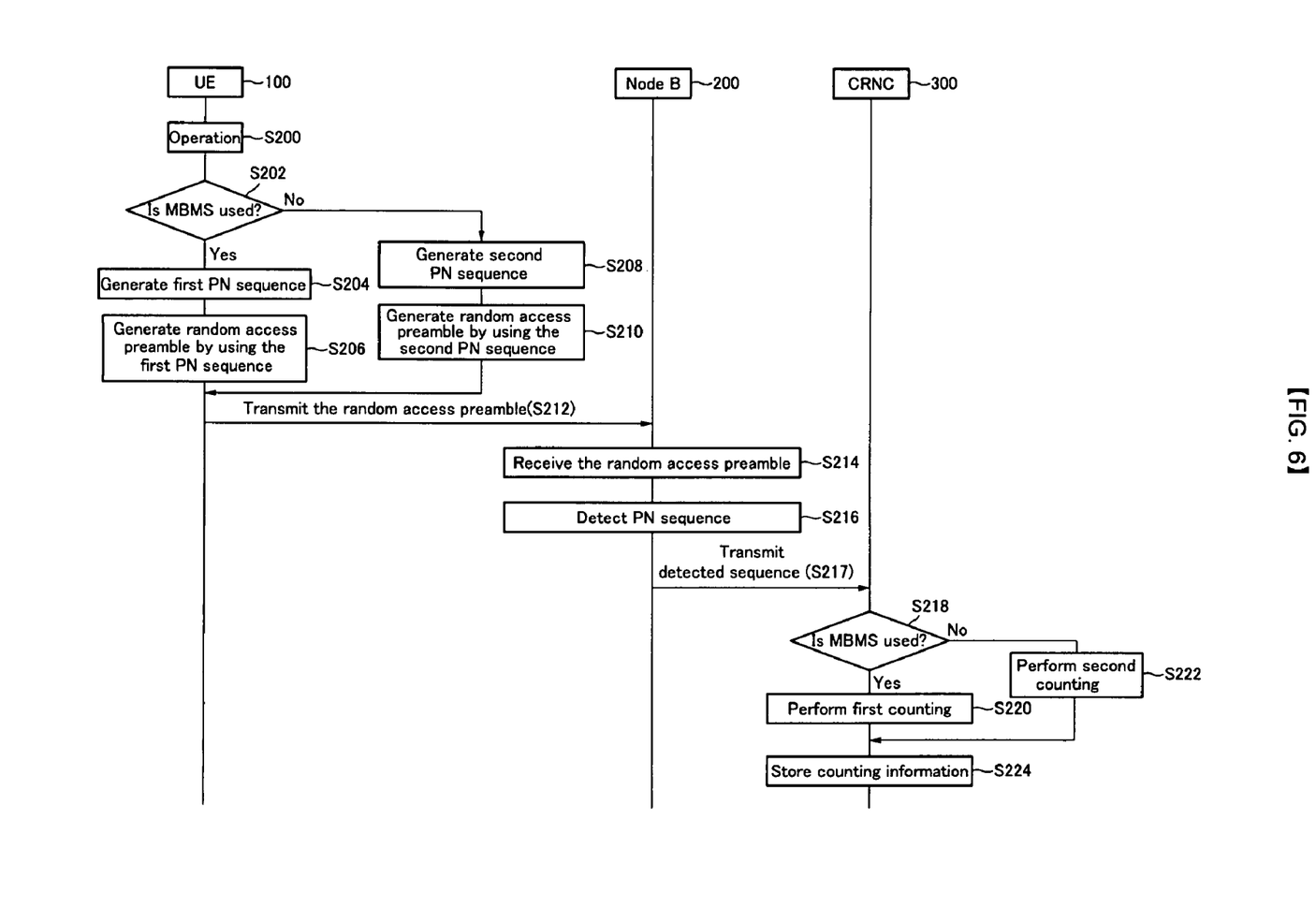
FIG. 6 is a data flowchart of an MBMS counting process for counting UEs using the MBMS in the case that a preamble transmitted from the UE is generated by a pseudo noise (PN) sequence in the 3GPP wireless communication system according to the first exemplary embodiment of the present invention.

FIG. 6 is a dataflow of a process for counting UEs using an MBMS when the preamble transmitted from a UE is generated by using a PN sequence in the 3GPP wireless communication system according to the first exemplary embodiment of the present invention.

As shown in FIG. 6, when the preamble transmitted from the UE is generated by using the PN sequence, it is assumed that an MBMS counting process for counting UEs using an MBMS is set to use a PN sequence between the UE 100 and the CRNC 300 in the WCDMA system by the network manager.

When the UE 100 is operated in step S200, the UE 100 receives a request for an MBMS from a user.

The UE 100 determines whether an MBMS request is received from the user in step S202, and generates a first PN sequence based on predetermined sequence setting information upon arrival of a request in step S204. In this case, the first PN sequence is dedicated to the MBMS.

When the UE 100 does not receive a request in step S202, the UE 100 generates a second PN sequence based on the predetermined sequence setting information in step S208. In this case, the second PN sequence is dedicated to a non-MBMS.

Herein, the first PN sequence and the second PN sequence generated by the UE 100 include a cell identifier for identifying a UE 100 included in a cell managed by the Node B 200 of FIG. 2.

The UE 100 generates a random access preamble by using the first PN sequence or the second PN sequence in steps S206 and S210, and transmits the random access preamble to the Node B 200 in step S212.

The Node B 200 receives the random access preamble transmitted from the UE 100 in step S214, and detects a PN sequence from the received random access preamble in step S216. In addition, the Node B 200 transmits the detected sequence to the CRNC 300, in step S217.

The CRNC 300 determines whether the sequence received from the Node B 200 is dedicated to the MBMS by using the predetermined sequence setting information, in step S218.

When it is determined in step S218 that the sequence is dedicated to the MBMS, the CRNC 300 performs a first MBMS counting process for counting UEs using the MBMS and stores the counting information in steps S220 and 224.

When it is determined in step S218 that the sequence is dedicated to a non-MBMS, the CRCN 300 performs a second MBMS counting process for counting UEs using the non-MBMS and stores the counting information in steps S222 and 224.

An apparatus for counting UEs that use an MBMS based on a random access preamble in a 3GPP LTE wireless communication system according to a second exemplary embodiment of the present invention, and a method thereof, will now be described in more detail.

Figure 7:
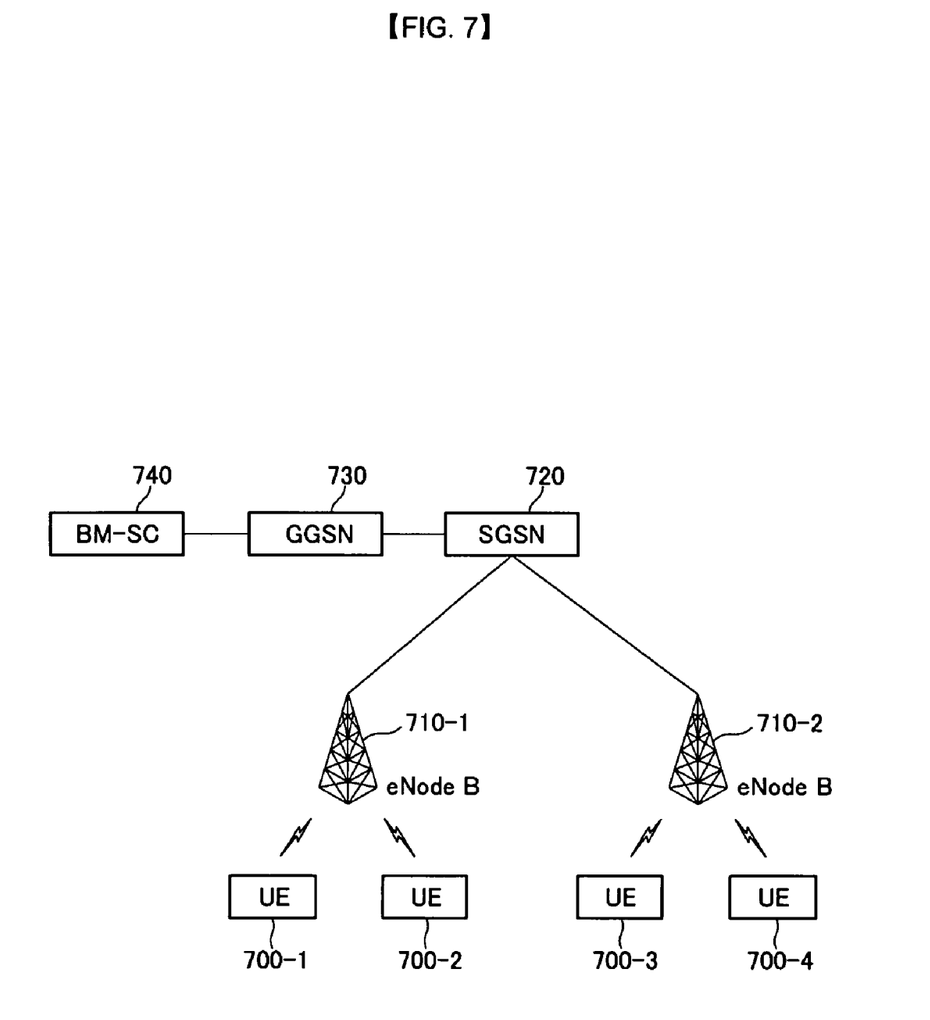
FIG. 7 is a block diagram of a 3GPP wireless communication system according to a second exemplary embodiment of the present invention.

FIG. 7 is a block diagram of the 3GPP wireless communication system according to the second exemplary embodiment of the present invention.

As shown in FIG. 7, the 3GPP wireless communication system according to the second exemplary embodiment of the present invention is provided as an LTE wireless communication system using a SC-FDMA.

The LTE wireless communication system includes a BM-SC 740, a GGSN 730, a SGSN 720, and an eNode B 710, and the GGSN 730, the SGSN 720, the eNode B 710, and the center 740 are connected to each other through a wired link.

In addition, a UE 700 accesses the eNode B 710 through a wireless link and receives MBMS data from the BM-SC 740. In this case, the UE 700 and the eNode B 710 communicate data by using the SC-FDMA.

The BM-SC 740 is a center providing an MBMS to the UE 700.

The GGSN 730 manages a plurality of SGSNs 720, manages sessions of packets received from the plurality of SGSNs 720, and manages mobility of the UE 700 as a gateway node of the 3GPP network, and the SGSN 720 processes a received packet call that matches the eNode B 710, manages a session, and manages mobility of the UE 700.

The eNode B 710 is connected with the UE through a wireless link and connected with the SGSN 720 through a wired link, and provides MBMS data transmitted through the wired link to the UE 700.

In addition, the eNode B 710 receives a random access preamble from the UE 700, and detects a constant amplitude zero auto correlation (CAZAC) sequence and a Hadamard sequence from the received random access preamble according to sequence setting information predetermined by a network manager.

The eNode B 710 determines whether the detected sequence is dedicated to an MBMS, and performs an MBMS counting process according to a result of the determination.

The UE 700 generates a CAZAC sequence and a Hadamard sequence based on MBMS use information according to sequence setting information predetermined by a network manager, generates a random access preamble by using the CAZAC sequence and the Hadamard sequence, and transmits the random access preamble to the eNode B 710. In addition, the UE 700 receives MBMS data, which has been transmitted to the eNode B 710 from the BM-SC 740, from the eNode B 710.

In this case, the random access preamble transmitted from the UE 700 is generated by a product of the CAZAC sequence or the Hadamard sequence, and information on whether to use the MBMS is included in the CAZAC sequence or the Hadamard sequence according to the predetermined sequence setting information. A random access preamble P(i) generated by the UE 700 can be represented as given in Math Figure 12.

$$P(i) = A_i * H_i$$ [Math Figure 12]

Where P(i) denotes a preamble, A(i) denotes a CAZAC sequence, $H_i$ denotes a Hadamard sequence, and i denotes 0, 1, 2, 3, ..., n−1 (n is a natural number).

Figure 8:
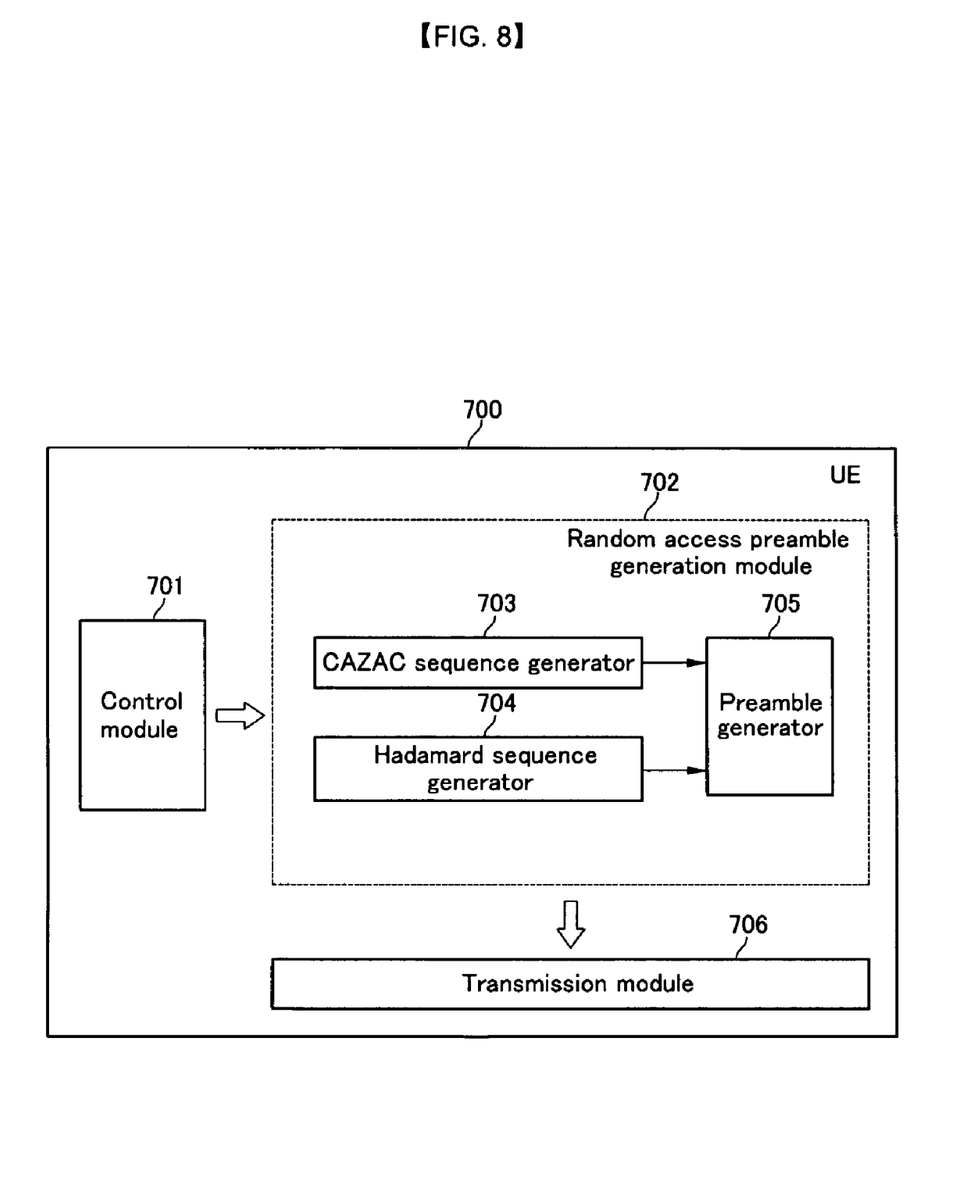
FIG. 8 is a detailed block diagram of a UE using an MBMS in the 3GPP wireless communication system according to the second exemplary embodiment of the present invention.

FIG. 8 is a detailed block diagram of a UE using an MBMS in the 3GPP wireless communication system according to the second exemplary embodiment of the present invention.

As shown in FIG. 8, the UE 700 according to the second exemplary embodiment of the present invention includes a control module 701, a random access preamble generation module 702, and a transmission module 706.

The control module 701 receives sequence setting information for a sequence to be used in generation of a preamble from a network manager, stores the sequence setting information, and provides the stored sequence setting information to the random access preamble generation module 702. In this case, the stored sequence setting information may be the same as the sequence setting information stored in the eNode B 710 of FIG. 7, and may be modified by the network manager. When modifying the sequence setting information stored in the control module 701, sequence setting information that the eNode B 710 uses when detecting a preamble must also be modified.

In addition, the control module 701 provides information on whether to use the MBMS to the random access preamble generation module 702. Herein, the information is included in a request received from a user.

The random access preamble generation module 702 includes a CAZAC sequence generator 703, a Hadamard sequence generator 704, and a preamble generator 705, and generates a random access preamble to be transmitted during initial access based on the predetermined sequence setting information according to a control of the control module 701 and transmits the random access preamble to the transmission module 706.

In this case, the random access preamble generated by the random access preamble generation module 702 is formed by a product of the CAZAC sequence or the Hadamard sequence, and information on whether to use an MBMS is included in the CAZAC sequence or the Hadamard sequence by the predetermined sequence setting information.

The CAZAC sequence generator 703 receives information on whether to use the MBMS from the control module 701, and when the MBMS is used, the CAZAC sequence generator 703 provides a first CAZAC sequence to the preamble generator 705. In addition, when the MBMS is not used, the CAZAC sequence generator 703 provides a second CAZAC sequence to the random access preamble generator 705. Herein, it is assumed that the first CAZAC sequence is dedicated to the MBMS and the second CAZAC sequence is dedicated to a non-MBMS based on the sequence setting information received from the control module 701.

In addition, the CAZAC sequence generator 703 provides a default CAZAC sequence to the random access preamble generator 705.

The Hadamard sequence generator 705 receives information on whether to use the MBMS from the control module 701, and when the MBMS is used, the Hadamard sequence generator 704 provides a first Hadamard sequence to the random access preamble generator 705. When the MBMS is not used, the Hadamard sequence generator 705 provides a second Hadamard sequence to the random access preamble generator 705. Herein, it is assumed that the first Hadamard sequence is dedicated to the MBMS and the second Hadamard sequence is dedicated to a non-MBMS.

The Hadamard sequence generator 704 provides a default Hadamard sequence to the random access preamble generator 705 according to a control of the control module 701.

The random access preamble generator 705 generates a random access preamble by multiplying the CAZAC sequence and the Hadamard sequence based on the sequence setting information received from the control module 701, and transmits the random access preamble to the transmission module 706. In this case, the random access preamble generator 705 generates the random access preamble by using Math Figure 12.

The random access preamble generated by the preamble generator 705 may be formed by multiplying a CAZAC sequence based on the received sequence setting information and the default Hadamard sequence received from the Hadamard sequence generator 704. Herein, the CAZAC sequence is generated by the CAZAC sequence generator 703 in accordance with whether to use the MBMS.

In addition, the random access preamble generated by the preamble generator 705 may be formed by multiplying a Hadamard sequence based on whether to use the MBMS according to the received sequence setting information and the default CAZAC sequence received from the CAZAC sequence generator 702.

The transmission module 706 includes a wireless communication interface and communicates with the eNode B 710 of FIG. 7 through the wireless communication interface, and provides the preamble received from the random access preamble generation module 702 to the eNode B 710. In this case, the transmission module 706 communicates data with the eNode B 710 by using a SC-FDMA.

An MBMS counting process for counting UEs using an MBMS in the 3GPP LTE wireless communication system according to the second exemplary embodiment of the present invention will now be described in more detail.

Figure 9:
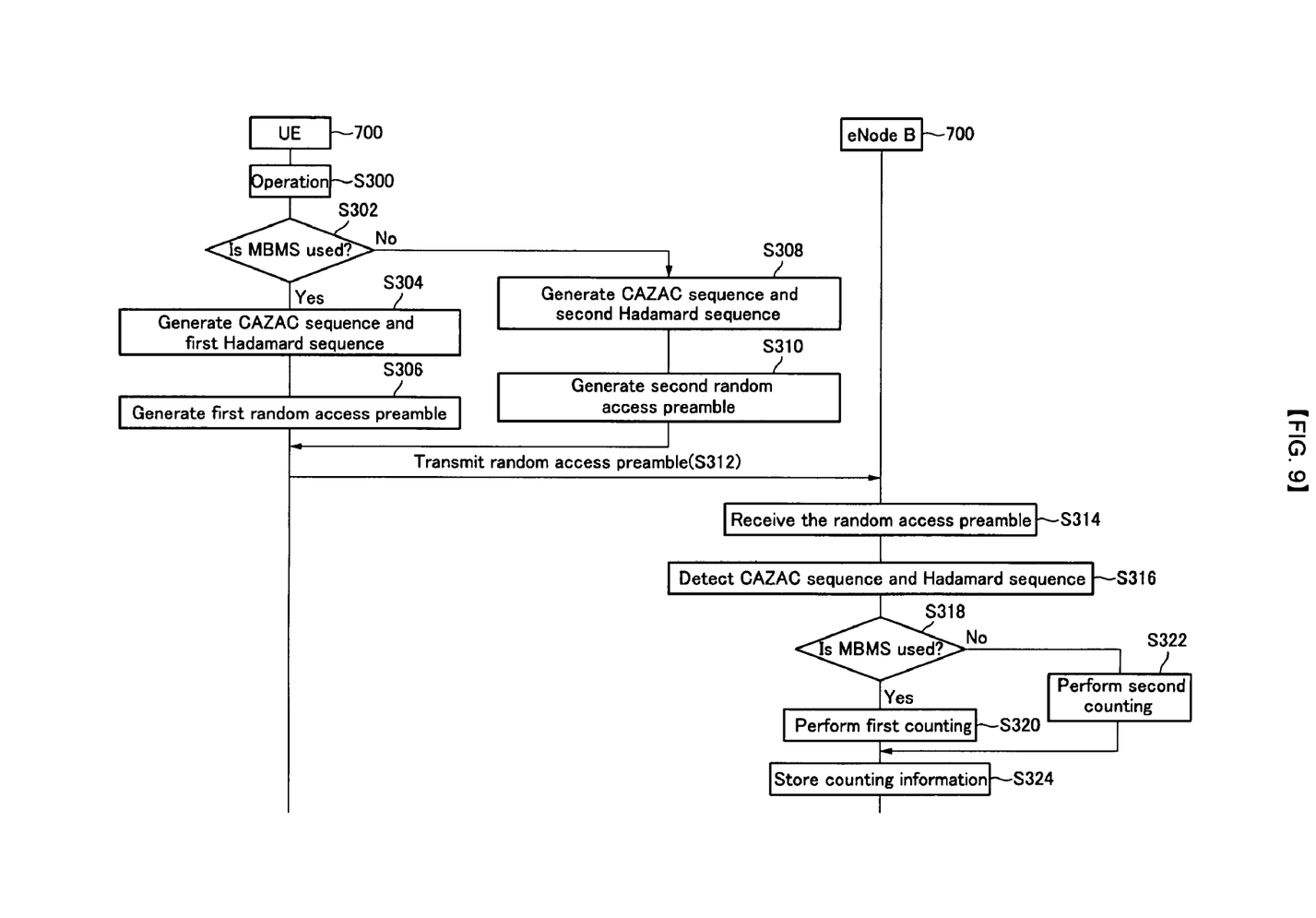
FIG. 9 is a data flowchart of an MBMS counting process for counting UEs using the MBMS in the 3GPP wireless communication system according to the second exemplary embodiment of the present invention.

FIG. 9 is a dataflow of an MBMS counting process for counting UEs using an MBMS in the 3GPP wireless communication system according to the second exemplary embodiment of the present invention.

As shown in FIG. 9, it is assumed that a random access preamble used in the MBMS counting process according to the second exemplary embodiment of the present invention is set to be generated by using a Hadamard sequence between the UE 700 and the eNode B 710 by a network manager.

When the UE 700 is operated in step S300, the UE 700 receives a request for an MBMS from a user.

The UE 70 determines whether an MBMS request is received from the user in step S302, and generates a CAZAC sequence and a Hadamard sequence based on predetermined sequence setting information upon arrival of a request, in step S304. In this case, the Hadamard sequence is dedicated to an MBMS.

When the UE 700 does not receive a request in step S302, the UE 700 generates a CAZAC sequence and a Hadamard sequence based on the predetermined sequence setting information, in step S308. In this case, the Hadamard sequence is dedicated to a non-MBMS.

Herein, the CAZAC sequence generated by the UE 700 includes a cell identifier for identifying the UE 100 in a cell managed by the eNode B 710.

The UE 700 generates a random access preamble by using the CAZAC sequence and the Hadamard sequence in steps S306 and S310, and transmits the generated random access preamble, in step S312.

The eNode B 710 receives the random access preamble from the UE 700 in step S314, and detects the Hadamard sequence from the received random access preamble in step S316. In addition, the eNode B 710 determines whether the detected Hadamard sequence is dedicated to the MBMS by using the predetermined sequence setting information, in step S318.

When it is determined in step S318 that the Hadamard sequence is dedicated to the MBMS, the eNode B 710 performs a first counting in step S320 and stores the counting information in step S324. That is, when the Hadamard sequence is dedicated to the MBMS, the eNode B 710 updates the stored MBMS counting information.

When it is determined in S318 that the Hadamard sequence is dedicated to a non-MBMS, the eNode B 710 performs a second counting process in step S322 and stores the counting information in step S324. That is, when the Hadamard sequence is dedicated to the non-MBMS, eNode B 710 updates the stored non-MBMS counting information.

Such a counting method can minimize complexity in random access probability management generated from the conventional MBMS counting process and unnecessary signaling for the random access probability.

The above-described exemplary embodiments of the present invention may be realized by an apparatus and a method, but may also be realized by a program that realizes functions corresponding to configurations of the exemplary embodiments or a recording medium that records the program. Such a realization can be easily performed by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. User equipment (UE) that communicates with a wireless communication system counting UEs that use a multimedia broadcasting and multicast service (MBMS), the UE comprising:
    a transmission module including a wireless communication interface and communicating with the wireless communication system;
    a preamble generation module for generating a sequence including information on a MBMS usage state based on sequence setting information, generating a preamble based on the sequence, and transmitting the preamble to the transmission module; and
    a control module for controlling the preamble generation module, receiving in which information on a sequence to be used in generation of the preamble is included from the network manager, storing the sequence setting information, and providing the sequence setting information to the preamble generation module,
    wherein the sequence including information on the MBMS usage state is a first sequence dedicated to the MBMS when the MBMS is used according to the sequence setting information, and is a second sequence dedicated to a non-MBMS when the MBMS is not used according to the sequence setting information.

2. The UE of claim 1, wherein the preamble generation module generates the sequence by using at least one of a signature sequence, a gold sequence, and a pseudo noise (PN) sequence.

3. The UE of claim 2, wherein the preamble generation module comprises:
    a first sequence generator for generating the first sequence or the second sequence by using the signature sequence according to the sequence setting information;
    a second sequence generator for generating a default sequence by using the gold sequence according to the sequence setting information; and
    a preamble generator for generating the preamble by using one of the first and second sequences generated by the first sequence generator and the default sequence based on the sequence setting information.

4. The UE of claim 2, wherein the preamble generation module comprises:
    a first sequence generator for generating a default sequence by using the signature sequence according to the sequence setting information;
    a second sequence generator for generating the first sequence and the second sequence by using the gold sequence based on the sequence setting information; and
    a preamble generator for generating the preamble by using the default sequence and one of the first and second sequences generated by the second sequence generator based on the sequence setting information.

5. The UE of claim 2, wherein the preamble generation module comprises:
    a third sequence generator for generating the first sequence and the second sequence by using the PN sequence according to the sequence setting information; and
    a preamble generator for generating the preamble based on the first sequence or the second sequence according to the sequence setting information.

6. The UE of claim 1, wherein the preamble generation module generates the sequence by using a CAZAC sequence or a Hadamard sequence.

7. The UE of claim 6, further comprising:
    a first sequence generator for generating one of the first sequence and the second sequence by using the CAZAC sequence according to the sequence setting information;
    a second sequence generator for generating a default sequence by using the Hadamard sequence according to the sequence setting information; and
    a preamble generator for generating the preamble by using one of the first and second sequences generated by the first sequence generator and the default sequence based on the sequence setting information.

8. The UE of claim 6, wherein the preamble generation module comprises:
    a first sequence generator for generating a default sequence by using the CAZAC sequence according to the sequence setting information;
    a second sequence generator for generating one of the first sequence and the second sequence by using the Hadamard sequence based on the sequence setting information; and
    a preamble generator for generating the preamble by using the default sequence and one of the first and second sequences generated by the second sequence generator based on the sequence setting information.

9. A wireless communication method of user equipment (UE) communicating with a wireless communication system that counts UEs using a multimedia broadcasting and multicast service (MBMS), the wireless communication method comprising:
    a) receiving a user request and determining whether an MBMS is used;
    b) generating a sequence including information on a MBMS usage state based on sequence setting information according to the determination, wherein the sequence setting information is predetermined by a network manager and includes information on a sequence to be used in generation of a preamble;

c) generating the preamble based on the generated sequence; and d) transmitting the generated preamble to the wireless communication system, wherein b) comprises:

generating a sequence dedicated to the MBMS when the MBMS is used according to the determination; and generating a sequence dedicated to a non-MBMS when the MBMS is not used according to the determination.

10. The wireless communication method of claim 9, wherein the sequence corresponds to one of a signature sequence, a gold sequence, and a pseudo noise (PN) sequence.

11. The wireless communication method of claim 9, wherein the sequence is generated by using a CAZAC sequence or a Hadamard sequence based on the sequence setting information.

* * * * *